US010356362B1

(12) United States Patent
Rudberg et al.

(10) Patent No.: US 10,356,362 B1
(45) Date of Patent: Jul. 16, 2019

(54) CONTROLLING FOCUS OF AUDIO SIGNALS ON SPEAKER DURING VIDEOCONFERENCE

(71) Applicant: Google LLC, Mountain View, CA (US)

(72) Inventors: Tore Rudberg, Stockholm (SE); Christian Schuldt, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/872,450

(22) Filed: Jan. 16, 2018

(51) Int. Cl.
| H04N 7/15 | (2006.01) |
| H04R 1/32 | (2006.01) |
| H04R 1/40 | (2006.01) |
| H04R 3/00 | (2006.01) |
| H04R 5/04 | (2006.01) |
| H04S 3/00 | (2006.01) |

(52) U.S. Cl.
CPC .............. *H04N 7/15* (2013.01); *H04R 1/323* (2013.01); *H04R 1/406* (2013.01); *H04R 3/005* (2013.01); *H04R 5/04* (2013.01); *H04S 3/008* (2013.01); *H04R 2203/12* (2013.01); *H04R 2499/15* (2013.01)

(58) Field of Classification Search
None
See application file for complete search history.

(56) References Cited

U.S. PATENT DOCUMENTS

2018/0343534 A1* 11/2018 Norris ................ G06K 9/00228

FOREIGN PATENT DOCUMENTS

| JP | 2009156888 A | 7/2009 |
| WO | 2016034454 A1 | 3/2016 |

OTHER PUBLICATIONS

International Search Report and Written Opinion for International Application No. PCT/US2019/013505, dated Apr. 23, 2019, 11 pages.

* cited by examiner

*Primary Examiner* — Curtis A Kuntz
*Assistant Examiner* — Kenny H Truong
(74) *Attorney, Agent, or Firm* — Brake Hughes Bellermann LLP

(57) ABSTRACT

A non-transitory computer-readable storage medium may include instructions stored thereon. When executed by at least one processor, the instructions may be configured to cause a computing system to determine that a video system is aiming at a single speaker of a plurality of people, receive audio signals from a plurality of microphones, the received audio signals including audio signals generated by the single speaker, based on determining that the video system is aiming at the single speaker, transmit a monophonic signal, the monophonic signal being based on the received audio signals, determine that the video system is not aiming at the single speaker, and based on the determining that the video system is not aiming at the single speaker, transmit a stereophonic signal, the stereophonic signal being based on the received audio signals.

13 Claims, 12 Drawing Sheets

CONTROLLING FOCUS OF AUDIO SIGNALS ON SPEAKER DURING VIDEOCONFERENCE

BACKGROUND

During videoconferences, a single person can be speaking at a time. A video camera can aim and/or focus on the single person who is speaking. Persons at a receiving end of the videoconference can perceive noise originating from sources other than the speaker as originating from the same direction as the speaker, which can be perceived as unnatural.

SUMMARY

According to an example, a non-transitory computer-readable storage medium may include instructions stored thereon. When executed by at least one processor, the instructions may be configured to cause a computing system to determine that a video system is aiming at a single speaker of a plurality of people, receive audio signals from a plurality of microphones, the received audio signals including audio signals generated by the single speaker, based on determining that the video system is aiming at the single speaker, transmit a monophonic signal, the monophonic signal being based on the received audio signals, determine that the video system is not aiming at the single speaker, and based on the determining that the video system is not aiming at the single speaker, transmit a stereophonic signal, the stereophonic signal being based on the received audio signals.

According to an example, a non-transitory computer-readable storage medium may include instructions stored thereon. When executed by at least one processor, the instructions may be configured to cause a computing system to determine a first direction of a speaker that a video system is aiming at, receive audio signals from a plurality of microphones, generate a first audio signal based on the received audio signals and focusing on the first direction, determine a second direction of a noise source other than the speaker, generate a second audio signal based on the received audio signals and focusing on the second direction, and generate a stereophonic signal based the first audio signal and the second audio signal.

According to an example, a method may be performed by a computing system. The method may comprise determining that a video system is aiming at a single speaker, determining a first direction of the single speaker from an array of microphones, based on determining that the video system is aiming at the single speaker and the first direction of the single speaker, generating a first beamformed signal based on beamforming, in the first direction, multiple first direction audio signals received by the array of microphones, determining a second direction of a noise source other than the single speaker, generating a second beamformed signal based on beamforming, in the second direction, multiple second direction audio signals received by the array of microphones in the second direction, generating a monophonic signal based on the first beamformed signal and the second beamformed signal, the first beamformed signal having greater weight relative to the second beamformed signal, determining that the video system is not aiming at the single speaker, and based on determining that the video system is not aiming at the single speaker, generating a stereophonic signal, the stereophonic signal including the first beamformed signal and the second beamformed signal as distinct signals.

The details of one or more implementations are set forth in the accompa-nying drawings and the description below. Other features will be apparent from the description and drawings, and from the claims.

DETAILED DESCRIPTION

Figure 1:
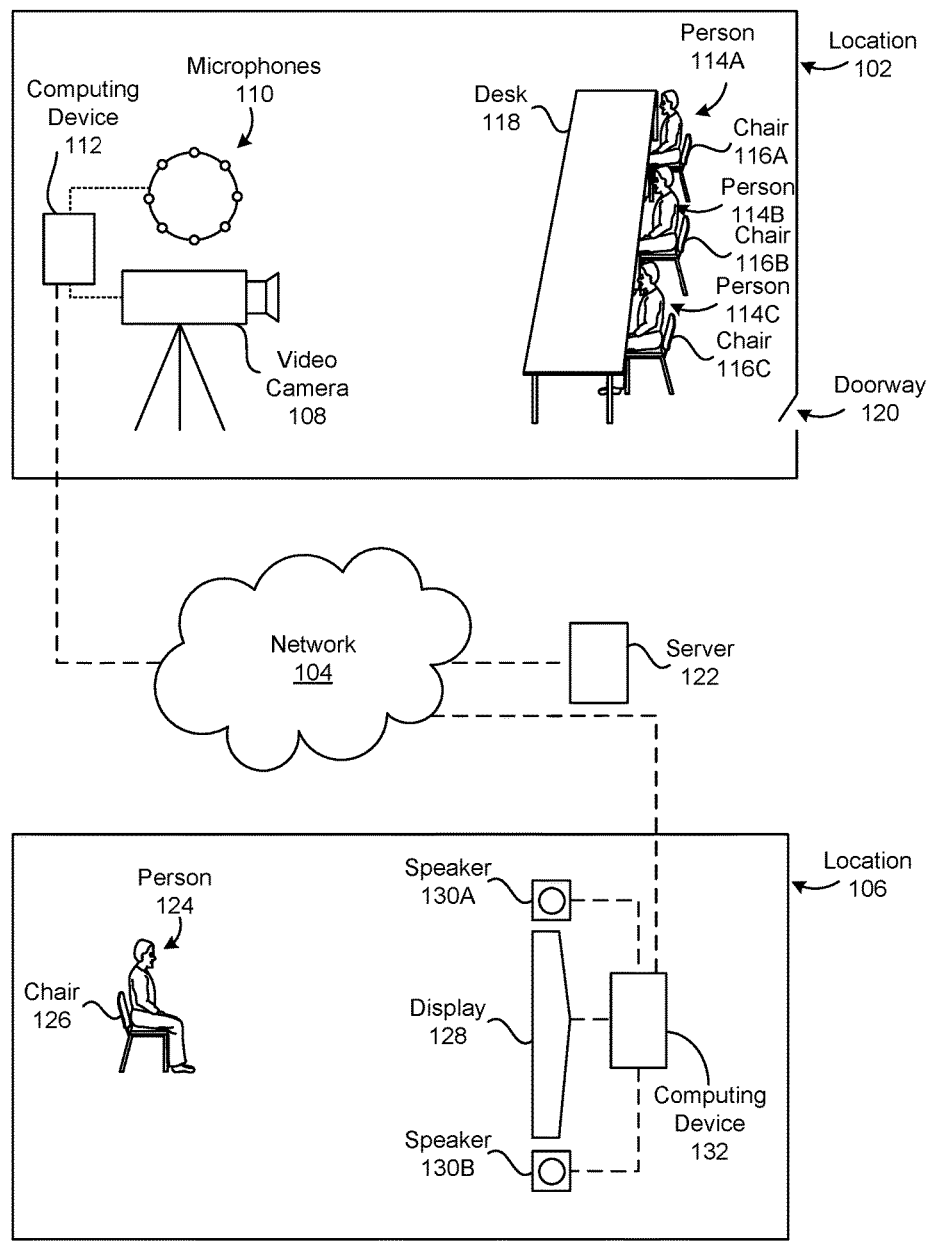
FIG. 1 is a diagram of a videoconferencing system according to an example.

A computing system can generate and/or transmit monophonic audio signals when a video system, such as a video camera, is aiming at and/or focusing on a single speaker. The monophonic audio signals can be focused on the single speaker, and can be generated by beamforming and/or preferentially weighting audio signals emitted along a path, toward the object such as the single, human speaker, when the video system generating the video signals is focusing on, and/or aiming at, the single speaker.

In stereo audio conferencing, two audio signals can be generated by beamforming in two different directions. A technical problem with simply beamforming in two different directions, which are independent of a speech source, such as to the left and to the right, to form a left audio channel and a right audio channel, is that the speech source, the human speaker, is not targeted, resulting in less than optimal capturing of the speech from the human speaker. A technical problem with beamforming in only one direction, toward the human speaker, is that when the audio signals are reproduced at a receiving end, noise from other sources will seem to originate from the same direction as the speech source. A technical solution to these technical problems of beamforming in two different directions and beamforming in a single direction is to generate one or more beamformed signals in the direction of the speech source and/or human speaker, and a second beamformed signal in a direction of a noise source other than the speech source and/or human speaker, and attenuating and/or reducing the weight of the beamformed signal(s) in the direction of the speech source and/or human speaker. Technical advantages of beamforming in the direction of the speech source and/or human speaker and in the direction of the noise source include the speech being clearly reproduced and the noise from the noise source(s) being reproduced with a quality of being received from a direction other than the direction of the speech source and/or human speaker. A further technical advantage is that the audio signals focusing on the single speaker when the video camera is focusing on and/or aiming at the single speaker can overcome the otherwise unnatural experience of hearing sounds from different sources during a videoconference, compared to a face-to-face meeting in which participants would turn their heads toward the person who is currently speaking.

At times, the computing system can generate a single monophonic signal focusing on the speech source and/or single speaker, such as by beamforming in a direction of the speech source and/or single speaker. A technical problem of generating a single monophonic signal focusing on the speech source and/or single speaker is that when the video system is no longer aiming at and/or focusing on the speech source and/or single speaker, the audio signal, which focuses on the single speaker, will not correspond to the video signal, which is capturing more objects and/or persons than only the single speaker. At times, the computing system can generate a stereophonic signal with audio signals received from different directions. A technical problem of generating the stereophonic signal is that when a single human speaker is speaking and the video system is generating an image of only the single speaker, the audio signals capturing noises from different directions will not correspond to the video image. A technical solution for these technical problems is for the computing system to transition from the monophonic signal to a stereophonic signal when the video system is no longer aiming at and/or focusing on the single speaker, such as when the video system zooms out and shows persons other than the single speaker. Technical advantages of transitioning to the stereophonic signal when the video system is no longer aiming at and/or focusing on the single speaker include matching the audio output to the video output and reducing an unnatural experience of seeing a group of people but hearing sounds from only one of them even though others may also be making noise, such as by whispering or shuffling papers. The stereophonic signal can include the monophonic signal generated and/or transmitted when the video system was aiming at and/or focusing on the single speaker, as well as an additional audio signal, which can include audio signals from a different set of microphones and/or focused on a different direction. Controlling the focus of the audio signals on the speaker based on whether the video system is focusing on the single speaker can create a more natural experience for the viewer(s)/listener(s). The computing system can also create a natural sounding combined audio signal and/or stereophonic signal by generating a second and/or additional audio signal, such as by beamforming or preferentially weighting received audio signals, toward a noise source other than the single speaker, and combining the audio signals from the single speaker and the noise source, with the audio signals from the single speaker having greater weight than the audio signals from the noise source. The stereophonic signal including the audio signals from the single speaker and the noise source avoid an unnatural experience on the part of listeners and viewers that noise from sources other than the speaker seems to originate from the same direction as the speaker.

FIG. 1 is a diagram of a videoconferencing system according to an example. The videoconferencing system can send video and audio signals from a first location (e.g., a first conference room) 102 to a second location (e.g., a second conference room) 106 via a network 104, enabling one or more persons 124 in the second location 106 to see and hear one or more persons 114A, 114B, 114C in the first location 102. The videoconferencing system can include any combination of components shown in FIG. 1, such as components in both locations 102, 106, components in both locations 102, 106 and a server 122, components in only the location 102, or components in the location 102 and the server 122, as non-limiting examples.

The location 102 can include one or more persons 114A, 114B, 114C, any number of whom may be speaking and/or may be sources of noise and/or audio signals. While three persons 114A, 114B, 114C are shown in the example location 102 of FIG. 1, any number of persons 114A, 114B, 114C can be in the location 102. In some examples, the persons 114A, 114B, 114C can each sit on chairs 116A, 116B, 116C behind a desk 118. The location 102 can include a doorway 120, which can be a source of noise and/or audio signals, such as from noise generated by a door of the doorway 120 opening and closing, or from noise originating outside the location 102 and entering the location 102 through the doorway 120.

The videoconferencing system can include a video camera 108 in the first location 102. The video camera 108 can be part of a video system, and can capture optical signals and/or video signals within the location 102. The video camera 108 can zoom in to a small part of the location 102, such as to aim at, focus on, and/or capture images of a single human speaker such as the person 114B, and/or can zoom out to receive and/or process video signals from a larger part of the location 102, such as to capture images of, aim at, and/or focus on all or multiple of the persons 114A, 114B, 114C sitting at the desk 118. The video camera 108 can also pan left and right, and/or up and down, to change the person 114A, 114B, 114C and/or portion of the location 102 that the video camera 108 is focusing on. The video camera 108 can be controlled manually, or by software that causes the video camera 108 to focus on an active speaker in the location 102, such as by heuristics or machine learning techniques. In some examples, the video camera 108 can send a signal to a computing device 112 and/or microphones 110 indicating a direction in which the video camera 108 is focusing.

The videoconferencing system can include multiple and/or a plurality of microphones 110, and/or an array of microphones 110, in the first location 102. The microphones 110 can capture audio signals in the location 102. The microphones 110, the computing device 112 receiving audio signals from the microphones 110, and/or other components of the videoconferencing system, can generate audio signals such as one or more beamformed signals based on the received audio signals that each focus on audio signals received from a particular direction and/or are received along a particular path. The microphones 110 and/or computing device 112 can generate the beamformed signals by, for example, beamforming audio signals received by the microphones 110 in a same direction that the video camera 108 is aiming and/or focusing, such as a direction of a single speaker that the video camera 108 is aiming at and/or focusing on. The generation of beamformed signals by beamforming can include shifting phases of received audio signals so that signals received by the microphones 110 from the direction in which the video camera 108 is aiming and/or focusing constructively interfere with each other, and/or increasing or decreasing amplitudes of signals received by different microphones based on the locations of the microphones and the direction of the focus. The shifting can be based on the direction, a known speed of sound, and a known distance between the microphones, so that the constructive interference is caused by audio signals received by two (or more) microphones 110 coming from the direction in which the video camera 108 is aiming and/or focusing being processed as if the audio signals were received by the two (or more) microphones 110 at the same time, whereas audio signals received by microphones 110 coming from directions other than the direction in which the video camera 108 is aiming and/or focusing are processed as if the audio signals were received at different times, resulting in destructive interference.

The videoconferencing system can include a computing device 112 in the location 102. The computing device 112 can receive video signals from the video camera 108 and can receive audio signals from the microphones 110. In some examples, the computing device 112 can control the direction, aim, and/or focus of the video camera 108 based on determinations by the computing device 112 of which person(s) 114A, 114B, 114C is actively speaking. In some examples, the computing device 112 can control the direction of focus and/or generation of focused and/or beamformed audio signals such as by beamforming by the microphones 110, and/or perform beamforming of audio signals received by the computing device 112 from the microphones 110. The computing device 112 in the location 102 in which the video and audio signals of the speaker are recorded can be considered a local computing device.

In some examples, the videoconferencing system can generate monophonic signals based on audio signals received by the microphones 110 when the video camera 108 is aiming at and/or focusing on the single speaker, and transmit a stereophonic signal based on audio signals received by the microphones when the video camera 108 has stopped and/or is no longer aiming at and/or focusing on the single speaker. A receiving system can transmit the same monophonic signal out of all speakers, and can transmit a first signal from the stereophonic signal out of a first (or more) speaker, and a second signal from the stereophonic signal out of a second (or more) speaker.

In some examples, the monophonic signal can be based on signals received from a set of, which can include some or all of, microphones from the microphones 110. In some examples, the stereophonic signal can include a first audio signal received from a first microphone and/or first set of microphones from the microphones 110, and a second audio signal received from a second microphone and/or second set of microphones from the microphones 110, the first set being different from the second set.

In some examples, the videoconferencing system can generate monophonic signals by focusing audio signals in a specific direction, such as based on first beamformed audio signals that are beamformed in a direction that the video camera 108 is focusing and/or aiming, such as in a direction of a single speaker that the video camera 108 is focusing on and/or aiming at. If and/or when the video camera 108 stops focusing on and/or aiming at an object, and/or is no longer focusing on and/or aiming at an object, the videoconferencing system can generate stereophonic signals such as by generating a second (or more) beamformed signal and combining the second beamformed signal with the first beamformed signal that focuses in the direction that the video camera 108 is focusing and/or aiming. The generation of stereophonic signals based on multiple beamformed signals can cause noise from more parts of the location 102 to be transmitted to remote participants of the videoconference along with audio signals transmitted from the speaker.

In some examples, the videoconferencing system can generate multiple focused and/or beamformed audio signals by beamforming audio signals in multiple directions. The videoconferencing system can, for example, generate a first beamformed signal focusing on a first direction based on beamforming, in a first direction of a human speaker, audio signals received from the first direction. The videoconferencing system can also generate a second beamformed signal focusing on a second direction based on beamforming, in a second direction of a noise source, different from the first direction, audio signals received from the second direction. The videoconferencing system can generate a combined signal and/or stereophonic signal based on combining the first beamformed signal and the second beamformed signal. The first beamformed signal can have greater weight within the combined and/or stereophonic signal, making the voice of the human speaker in the first direction easily audible, but still providing some of the background noise from the noise source to create a sound that is more similar to that experienced by a person actually in the location 102 and near the video camera 108 and microphones 110.

The video camera 108, microphones 110, and/or computing device 112 can be combined into one apparatus, or can be set up in the location 102 as standalone components and communicate with each other via wired or wireless interfaces. The computing device 112 can be in the same location 102 as the video camera 108 and microphones 110, or can be outside the location 102 and communicate with the video camera 108 and microphones 110 via wired or wireless interfaces. The videoconference system can also include a display and/or speakers in the location 102, so that the persons 114A, 114B, 114C from whom the video camera 108 and microphones 110 are capturing video and audio input can view and listen to persons in remote locations, such as a second location 106.

The computing device 112 can communicate with a computing device 132 in a remote, second location 106, and/or a remote server 122, via a network 104. The network 104 can include multiple interfaces and/or devices facilitating communication between computing devices, such as the Internet or, in the example of a videoconference system maintained within a corporate or college campus, a local area network (LAN). The server 122 can perform any combination of the functions, methods, and/or techniques described herein, such as controlling the focus, aim, and/or direction of the video camera 108, beamforming audio signals received by the microphones 110, and/or combining the beamformed signals and/or signals from different microphones to generate stereophonic signals, or may simply transmit the video and audio data between computing devices 112, 132. While two locations 102, 106 are shown in the videoconference system of FIG. 1, any number of locations may be included in the videoconference system, with persons in each location viewing and listening to one or more human speakers in a remote location(s) on a display and from electrical speakers.

The second location 106 can be remote from the first location 102. The second location 106 can include the computing device 132. The computing device 132 in the second location 106 can receive video and audio signals from the computing device 112 in the first location 102 and/or the server 122. The computing device 132 in the second location 106 can transmit the video and audio signals to a display 128 and electronic speakers 130A, 130B, respectively, to present the video and audio to a person 124 in the second location 106. In some examples, such as when the video camera 108 has stopped and/or is not focusing on and/or aiming at a single speaker, a first electronic speaker 130A can, based on a combined and/or stereophonic signal received from the computing device 112 via the computing device 132, output a first monophonic and/or audio signal such as words spoken by a human speaker, and a second electronic speaker 130B can, based on the combined and/or stereophonic signal received from the computing device 112 via the computing device 132, output a second monophonic and/or audio signal such as noise generated by a noise source other than the speaker. In some examples, such as when the video camera 108 is focusing on and/or aiming at the single speaker and the computing device 112 transmits a monophonic signal, both speakers 130A, 130B can output the same monophonic signal. The computing device 132 in the second location 106 in which the video and audio of the speaker are presented, rather than recorded and/or captured, can be considered a remote computing device.

The second location 106 can include a display 128 and one or more speakers 130A, 130B. The display 128 can present images based on the video data received by the display 128 from the computing device 132 in the second location 106, which may be the video captured by the video camera 108. The display 128 can include a traditional screen that generates images by projecting light toward the viewers, such as a cathode ray tube (CRT) display, plasma display, a light-emitting diode (LED) display, a liquid crystal display (LCD), a projector that projects images onto a screen, or a holographic system that creates a holographic image of the speaker and/or other persons in the first location 102, as non-limiting examples.

The speaker(s) 130A, 130B can output sound based on audio signals received from the computing device 132 in the second location 106, which may be based on the combined signal(s) generated by the computing device 112 in the first location 102 and/or microphones 110. The speaker(s) 130A, 130B can output the same sound, or in examples of receiving stereophonic signals, the speakers 130A, 130B can each output different sounds, such as sounds based on different audio signals generated based on beamforming in different directions or audio signals received by different sets of microphones.

A person 124 can be in the second location 106, watching and listening to the person(s) 114A, 114B, 114C who are in the first location 102, on the display 128 and from the speaker(s) 130A, 130B. The person 124 can sit on a chair 126. In some examples, the second location 106 can also include a video camera and microphones for capturing video and audio signals from the person 124 to present and/or output to persons in other locations, such as the first location 102.

Figure 2:
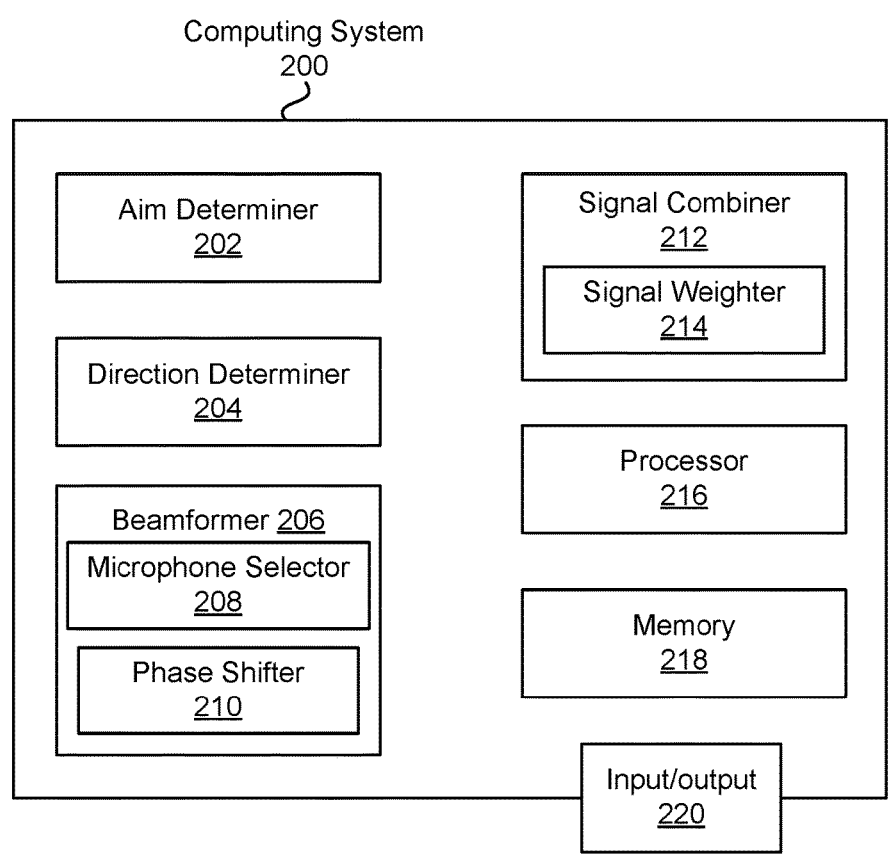
FIG. 2 is a block diagram of a computing system that can implement features of the videoconferencing system according to an example.

FIG. 2 is a block diagram of a computing system 200 that can implement features of the videoconferencing system according to an example. The features of the computing system 200 described herein can be included in, and/or performed by, the computing device 112 in the first location 102, the server 122, the computing device 132 in the second location 106, or any combination of the computing device 112, server 122, and/or computing device 132.

The computing system 200 can include an aim determiner 202. The aim determiner 202 can determine a direction of aim and/or focus of the video camera 108. The aim determiner 202 can determine that the video camera 108 is aiming at and/or focusing on a single, human speaker, and determine the direction of the single speaker from the video camera 108 and/or microphones 110. The video camera 108 can aim at and/or focus on the single, human speaker by pointing in the direction of the speaker so that the speaker is in or near the middle of an image captured by the video camera, and/or can focus on the single, human speaker by adjusting a lens of the video camera 108 so that light reflected from the speaker converges on a sensor of the video camera 108.

In some examples, the aim determiner 202 can determine the direction of aim and/or focus by the video camera 108 based on receiving and/or processing a single speaker signal from the video camera 108. The single speaker signal can indicate that the video camera 108 is aiming at and/or focusing on the single speaker and/or is capturing an image of only a single person 114B in the location 102, and can indicate a direction of the single speaker. The video camera 108 may have determined that a single speaker is speaking based on video data, such as facial expressions of the single speaker including lip movement, body language of other persons captured by the video camera 108 such as the other persons facing or angling their bodies toward the single speaker, or the video camera 108 capturing the image of only the single person 114B and not capturing images of other persons 114A, 114C in the location 102. The direction of the single speaker can be determined based on the direction that the camera 108 is pointing, and/or based on a location of the speaker within a captured image.

When the video camera 108 is aiming at and/or focusing on the single speaker, the computing system 200 can focus, and/or perform a beamforming operation, in the direction of the single speaker, and send a single speaker audio signal to the remote computing device 132. The single speaker audio signal can include the combined signal (discussed below) and an indication that only a single speaker is speaking, which can prompt the remote computing device 132 to output the audio as either stereophonic audio output or monophonic audio output. In some examples, the aim determiner 202 can determine that the video camera 108 is no longer aiming at and/or focusing on, and/or has stopped aiming at and/or focusing on, the single speaker, based on receiving and/or processing a multiple speaker signal from the video camera 108. The multiple speaker signal can indicate that the video camera 108 is aiming at and/or focusing on multiple speakers, and/or capturing a wide view that includes multiple persons 114A, 114B, 114C.

In some examples, the aim determiner 202 can determine that the video camera 108 is no longer aiming at and/or focusing on the single speaker such as the person 114B and/or that the video camera 108 has stopped aiming at and/or focusing on the single speaker. The aim determiner 202 can determine that the video camera 108 is no longer and/or has stopped aiming at and/or focusing on the single speaker based on receiving a multiple speaker signal from the video camera 108, or based on multiple persons being in the image captured by the video camera 108, according to example embodiments. When the video camera 108 is no longer aiming at and/or focused on, and/or has stopped aiming at and/or focusing on, the single speaker, the computing system 200 can send a multiple speaker audio signal to the remote computing device 132. The multiple speaker audio signal can include the combined and/or stereophonic signal (discussed below) and an indication that multiple human speakers are speaking, which can prompt the remote computing device 132 to output the audio stereophonically, such as outputting focused and/or beamformed audio signals from a first human speaker through a first electronic speaker and outputting focused and/or beamformed audio signals from a second human speaker through a second electronic speaker. In some examples, in response to the video camera 108 resuming aim and/or focus on the single speaker, and/or aiming at and/or focusing on a new single speaker, the computing system 200 can generate a monophonic signal focusing on the single speaker and transmit the generated monophonic signal to the remote computing device.

The computing system 200 can include a direction determiner 204. The direction determiner 204 can determine one or more directions in which to focus, beamform, and/or preferentially weight audio signals.

In some examples, the direction determiner 204 can determine that the computing system 200 should focus and/or beamform audio signals in a first direction that the aim determiner 202 has determined that the video camera 108 is aiming and/or focusing, such as a direction of a single speaker. In some examples, the direction determiner 204 can also determine the first direction of the single speaker based on first direction audio signals received by the microphones 110 in a first direction, such as audio signals indicating human speech, and comparing times of receiving and/or processing the audio signals by the different microphones 110. The direction determiner 204 can, for example, determine delays between audio signals received and/or processed by the different microphones, and determine the direction based on the determined delays, known speed of sound, and known distances between microphones (for example, if the delay between two microphones is equal to the time it takes sound to travel between the microphones, then the direction would be on or near a line extending through the two microphones in the direction of the microphone that first received and/or processed the audio signal). In some examples, the direction determiner 204 can determine the first direction of the single speaker based on determining that multiple first direction audio signals in the first direction are changing as a function of time, such as by performing beamforming operations in multiple directions and determining the direction that has the greatest changes in audio amplitude over a sampling period. The direction determiner 204 can, for example, perform beamforming operations in multiple directions over the sampling period to generate multiple beamformed signals, and determine that the direction of the beamformed signal with greatest change over the sampling period is in the direction of the speaker based on an assumption that human speech has a high degree of variation (for example, based on pauses between words and/or sentences).

In some examples, the direction determiner 204 can determine a second direction in which the computing system 200 should focus and/or beamform audio signals. The second direction can be a noise source other than the single speaker. The noise source can be a second human speaker, or other types of noise such as people speaking in the background, a door opening and/or closing, or papers or chairs being moved, as non-limiting examples. The direction determiner 204 can determine the second direction of a noise source based on comparing times of receiving and/or processing second direction audio signals received by the different microphones 110 in a second direction.

In some examples, the direction determiner 204 can determine a third direction in which the computing system 200 should focus and/or beamform audio signals. The third direction can be a noise source other than the single speaker. The noise source can be a second or third human speaker, or other types of noise such as people speaking in the background, a door opening and/or closing, or papers or chairs being moved, as non-limiting examples. The direction determiner 204 can determine the third direction of a noise source based on comparing times of receiving and/or processing the audio signals by the different microphones 110.

The computing system 200 can include a beamformer 206. The beamformer 206 can focus on audio signals received along a path, which may be a straight line or may bend in examples of reflected audio signals, to generate focused audio signals and/or beamformed signals. The beamformer 206 can generate focused audio signals and/or beamformed signals by combining and/or modifying signals received by and/or from the microphones 110 so that audio signals and/or noises received by multiple microphones in the direction of focus and/or performing beamforming operations experience constructive interference and/or are amplified, while audio signals and/or noises received by multiple microphones in directions other than the direction of focus and/or other than performing beamforming operations experience destructive interference and/or are reduced in magnitude. The beamformer 206 can beamform multiple audio signals received from a direction of the single speaker 114B, and/or can beamform multiple audio signals received from a direction other than the single speaker 114B.

The beamformer 206 can include a microphone selector 208. The microphone selector 208 can select multiple microphones 110, such as two microphones 110, for which a line intersecting the two microphones 110 is most closely parallel to the direction in which the beamforming is performed.

The beamformer 206 can include a phase shifter 210. The phase shifter 210 can shift the phase of the audio signal received by one of the selected microphones 110 so that the audio signals received by the selected microphones 110 constructively interfere with each other, amplifying the audio signals received in the direction of beamforming. The phase shifter 210 can modify and/or shift the phase(s) of the audio signals based on a distance between the selected microphones 110 and a speed of sound, delaying the phase of the microphone 110 closer to the noise source so that with respect to audio signals received from the noise source in the direction of focus and/or beamforming, the phase-shifted signal of the selected microphone 110 closer to the noise source matches the signal of the selected microphone 110 farther from the noise source. Noise sources in directions other than the direction of focus and/or beamforming will experience varying degrees of destructive interference between the selected microphones 110, reducing the amplitude of audio signals received from noise sources in directions other than the direction of focus and/or beamforming.

The beamformer 206 can process signals only from the selected microphones 110 in an example in which the beamformer 206 narrowly focuses on the direction of beamforming, so that all audio signals processed by the beamformer 206 experience constructive interference in the direction of beamforming. In examples of broader beamforming, the beamformer 206 can also process signals from microphones 110 other than the selected microphones, to process audio signals from noise sources in directions other than the direction of beamforming and/or the direction of the selected noise source. The beamformer 206 can reduce the weight of signals received from the microphones 110 other than the selected microphones 110 to narrow the beamforming (and/or increase the focus in the direction of focus) when the video camera 108 zooms in on the speaker, and/or can increase the weight of signals received from the microphones 110 other than the selected microphones 110 to broaden the beamforming (and/or decrease the focus in the direction of focus) when the video camera 108 zooms out away from the speaker, according to example implementations.

In some examples, the beamformer 206 can reduce the focus and/or beamforming by broadening beamforming, such as by increasing the weight of signals received from the microphones 110 other than the selected microphones 110, and/or by increasing the weight of a beamformed signal(s) other than the beamformed signal focusing in the direction of the single speaker. In some examples, the beamformer 206 can reduce beamforming by ceasing beamforming, such as ceasing and/or stopping the shifting of phases of signals received from microphones 110.

The computing system 200 can include a signal combiner 212. The signal combiner 212 can combine audio signals processed by the beamformer 206, which may be focused and/or beamformed in different directions, and/or may combine audio signals received by different sets of microphones. The signal combiner 212 can, for example, combine a first focused and/or beamformed signal for which beamforming was performed in a direction of an active human speaker and/or a single human speaker with a second, additional, and/or third beamformed signal(s) for which beamforming was performed in a direction(s) of a noise source(s) other than the direction of the active human speaker and/or a single human speaker. The signal combiner 212 can add the first focused and/or beamformed signal to the second focused and/or beamformed signal to generate a monophonic signal, or may include both the first focused and/or beamformed signal and the second focused and/or beamformed signal as distinct audio signals to generate a stereophonic signal that includes multiple focused and/or beamformed signals.

The signal combiner 212 can include a signal weighter 214. The signal weighter 214 can weight the signals of the audio signals combined by the signal combiner 212. The signal weighter 214 can, for example, reduce the weight and/or amplitude of certain signals, such as the signals processed or generated by the beamformer 206 in directions other than the direction of the active human speaker and/or a single human speaker and/or outside the path along which the beamformer 206 is focusing and/or performing beamforming. The signal weighter can preferentially weight beamformed audio signals, such as audio signals emitted along a path passing through at least one of the plurality of microphones and the speaker, as compared with sounds emitted from outside the path. If the aim determiner 202 determines that video camera 108 is aiming at and/or focusing on the active human speaker and/or a single human speaker, then the signal weighter 214 can reduce the relative weights and/or amplitudes of signals processed or generated by the beamformer 206 in directions other than the direction of the active human speaker and/or a single human speaker compared to the weight and/or amplitude of the signals processed or generated by the beamformer 206 in the directions of the active human speaker and/or a single human speaker. If the aim determiner 202 determines that the video camera 108 is no longer aiming at and/or focusing on the active human speaker and/or a single human speaker, and/or has stopped aiming at and/or focusing on the active human speaker and/or a single human speaker, such as by zooming out to capture images of more persons 114A, 114B, then the signal weighter 214 can increase the relative weights and/or amplitudes of signals processed or generated by the beamformer 206 in directions other than the direction of the active human speaker and/or a single human speaker compared to the weight and/or amplitude of the signals processed or generated by the beamformer 206 in the directions of the active human speaker and/or a single human speaker.

In some examples, the combined signal generated by the signal combiner 212 can include multiple focused and/or beamformed signals, with one focused and/or beamformed signal for each direction in which beamforming was performed, forming a stereophonic signal. Each focused and/or beamformed signal can include a single beamformed signal and an indication of a direction in which the beamforming was performed. For example, the combined and/or stereophonic signal can include a first focused and/or beamformed signal including the first beamformed signal and an indicator of the first direction, and a second focused and/or beamformed signal including the second beamformed signal and an indicator of the second direction. The computing device 112 can send the combined and/or stereophonic signal to the computing device 132, and the computing device 132 can transmit one focused and/or beamformed signal to each speaker 130A, 130B, based on the indicated direction, creating a stereo effect in the second location 106.

The computing system 200 can include at least one processor 216. The at least one processor 216 can include one or more processors, and can be included in one or more computing devices. The at least one processor 216 can execute instructions, such as instructions stored in memory, to cause the computing system 200 to perform any combination of methods, functions, and/or techniques described herein.

The computing system 200 can include at least one memory device 218. The at least one memory device 218 can be included in one or more computing devices. The at least one memory device 218 can include a non-transitory computer-readable storage medium. The at least one memory device 218 can store instructions that, when executed by the at least one processor 216, cause the computing system 200 to perform any combination of methods, functions, and/or techniques described herein. The at least one memory device 218 can store data accessed to perform, and/or generated by, any combination of methods, functions, and/or techniques described herein.

The computing system 200 can include input/output nodes 220. The input/output nodes 220 can receive and/or send signals from and/or to other computing devices. The input/output nodes 220 can include one or more video cameras 108, microphones 110, displays 128, and/or speakers 130A, 130B. The input/output nodes 220 can include devices for receiving input from a user, such as via a keyboard, mouse, and/or touchscreen. The input/output nodes 220 can also include devices for providing output to a user, such as a screen or monitor, printer, or speaker. The input/output nodes 220 can also include devices for communicating with other computing devices, such as networking and/or communication interfaces including wired interfaces (such as Ethernet (Institute for Electrical and Electronics Engineers (IEEE) 802.3), Universal Serial Bus (USB), coaxial cable, and/or High Definition Multiple Input (HDMI)), and/or wireless interfaces (such as Wireless Fidelity (IEEE 802.11), Bluetooth (IEEE 802.15), and/or a cellular network protocol such as Long-Term Evolution (LTE) and/or LTE-Advanced), as non-limiting examples.

Figure 3:
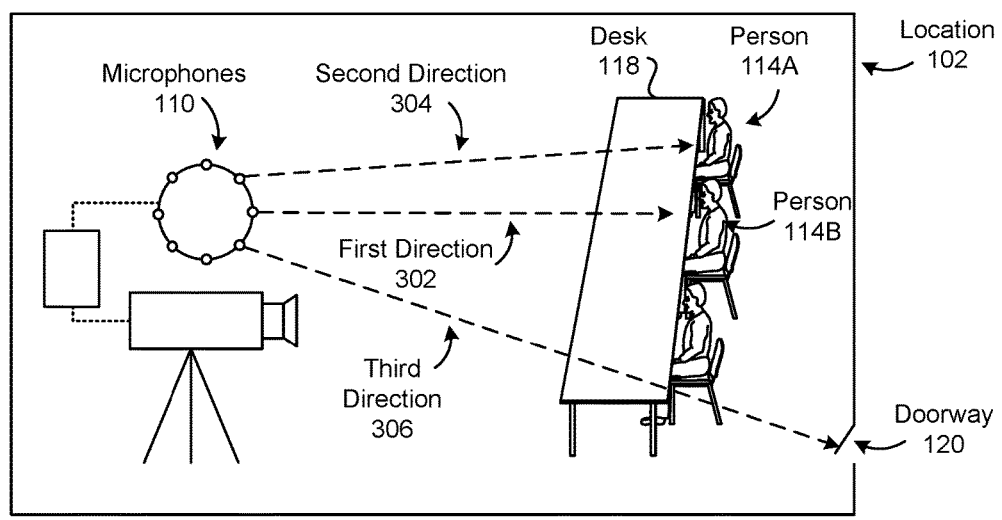
FIG. 3 is a diagram showing directions of beamforming within a location from which the videoconferencing system receives input according to an example.

FIG. 3 is a diagram showing directions 302, 304, 306 of beamforming within the location 102 from which the videoconferencing system receives input according to an example. The directions of beamforming can represent directions of focus by the computing system 200 and/or microphones 110. In some examples, the microphones 110, computing system 200, and/or videoconferencing system can focus and/or perform beamforming in a first direction 302 toward a single person 114B who is an active speaker to generate a first focused and/or beamformed signal. In some examples, the microphones 110, computing system 200, and/or videoconferencing system can focus and/or perform beamforming in a second direction 304 toward another noise source such as a person 114A who may be speaking at a same time as the person 114B to generate a second focused and/or beamformed signal. In some examples, the microphones 110, computing system 200, and/or videoconferencing system can focus and/or perform beamforming in a third direction 306 toward a noise source such as the doorway 120 to generate a third focused and/or beamformed signal, which may allow noise to travel into the location 102 from outside the location 102 and/or may generate noise from a door in the doorway 120 opening and/or closing. The focused and/or beamformed audio signal generated based on beamforming in the first direction 302 can be combined with the second audio signal and/or third audio signal to generate a combined signal and/or stereophonic signal.

Figure 4A:
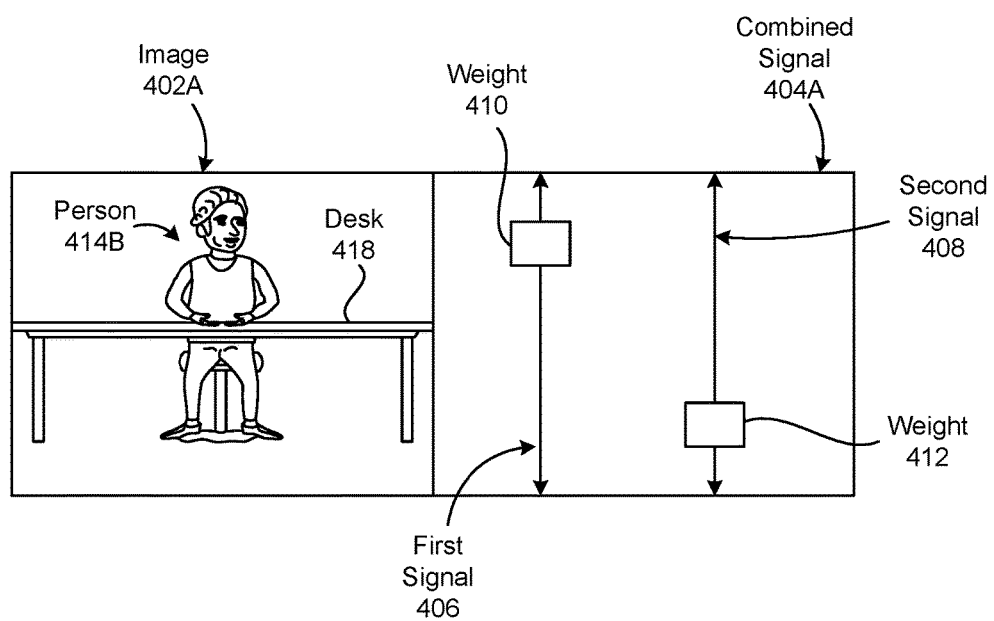
FIG. 4A is a diagram showing weights of beamformed signals when the video camera is focusing on a single person according to an example.

FIG. 4A is a diagram showing weights 410, 412 of beamformed signals when the video camera 108 is focusing on a single person 114B according to an example. In this example, the video camera 108 is focused on the single person 114B, and an image 402A generated by the video camera 108, computing device 112, computing system 200, and/or videoconference system shows, presents, and/or displays a person image 414B of the single person 114B who is the active speaker. The signal combiner 212 can generate a combined signal 404A, which can be monophonic, based on a first signal 406, which can be a beamformed signal in the first direction 302 toward the person 114B who is the active speaker, and a second signal 408 and/or additional signal, which can be a beamformed signal in the second direction toward a noise source such as a person 114A other than the person 114B who is the active speaker. The signal weighter 214 can, based on the determination that the video camera 108 and/or video system is focusing on the active and/or single speaker in the first direction 302, give the first signal 206 a greater weight 410 in the combined signal 404A than the weight 412 of the second signal 408. In examples in which the weight 412 of the second signal 408 is zero, the combined signal 404A includes only the first signal 406. In examples in which the weight 412 of the second signal 408 is greater than zero, the combined signal 404A can include both the first signal 406 and the second signal 408.

Figure 4B:
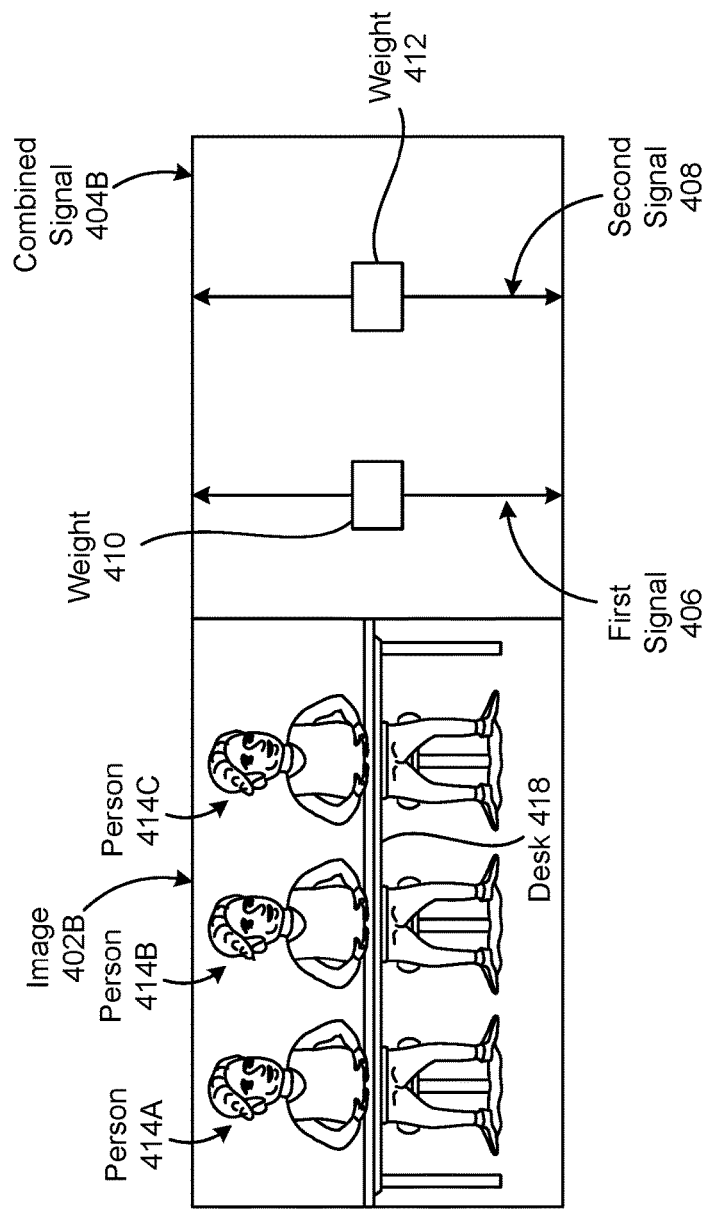
FIG. 4B is a diagram showing weights of beamformed signals when the video camera has zoomed out and is aiming and/or focusing on multiple persons according to an example.

FIG. 4B is a diagram showing weights 410, 412 of beamformed signals when the video camera 108 has zoomed out and is aiming at and/or focusing on multiple persons 114A, 114B, 114C according to an example. In this example, the video camera 108 is no longer aiming at and/or focusing on, and/or has stopped aiming at and/or focusing on, the person 114B who is the single speaker and/or the active speaker. The video camera 108 has zoomed out to present a broader image 402B, which includes three person images 414A, 414B, 414C (which are representations of the persons 114A, 114B, 114C) sitting at the desk image 418 (which is a representation of the desk 118). In some examples, based on determining that the video camera 108 is no longer aiming at and/or focusing on, and/or has stopped aiming at and/or focusing on, the single speaker, the computing system 200 can reduce the beamforming, such as by increasing the weight 412 of the second signal 408 relative to the weight 410 of the first signal 406, and/or decreasing the weight 410 of the first signal 406 relative to the weight 412 of the second signal 408, within the combined signal 404B. The first signal 406 can have less weight in the combined signal 404B after the video camera 108 has zoomed out than in the combined signal 404A when the video camera 108 was aiming at and/or focusing on the single person. In some examples, when the video camera 108 is no longer aiming at and/or focusing on, and/or has stopped aiming at and/or focusing on, the person 114B who is the single speaker and/or the active speaker, the combined signal 404B can be a monophonic signal that includes approximately equal contributions from the audio signals 406, 408, and the same combined monophonic signal can be outputted by both of the speakers 130A, 130B. In some examples, when the video camera 108 is no longer aiming at and/or focusing on, and/or has stopped aiming at and/or focusing on, the person 114B who is the single speaker and/or the active speaker, the combined signal 404B can be a stereophonic signal that includes distinct audio signals from each of the first signal 406 and second signal 408, and each of the first signal 406 and second signal 408 can be outputted by a different speaker 130A, 130B.

Figure 4C:
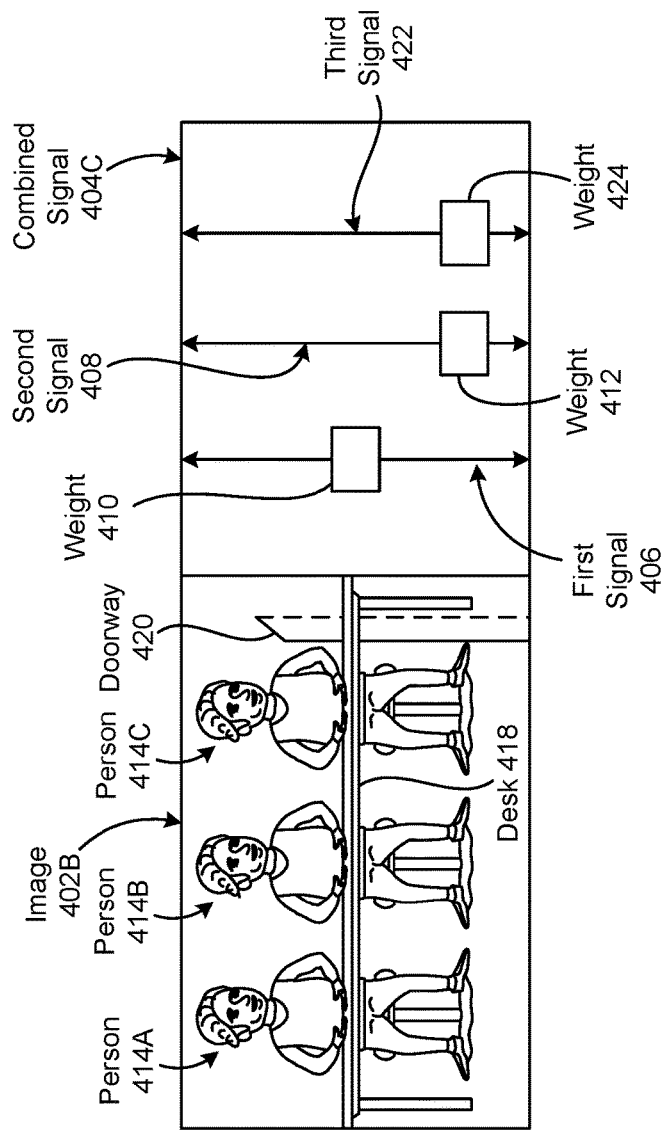
FIG. 4C is a diagram showing weights of beamformed signals when the video camera is aiming and/or focusing on a single person and the video conferencing system is performing beamforming on the single person and multiple noise sources according to another example.

FIG. 4C is a diagram showing weights of beamformed signals when the video camera 108 is aiming at and/or focusing on a single person 114B and the video conferencing system is performing beamforming on the single person 114B and multiple noise sources according to another example. In this example, the video camera 108 is aiming at and/or focusing on the person 114B who is the single speaker and/or active speaker, but has zoomed out to present a broader image 402C, which includes the three person images 414A, 414B, 414C sitting at the desk image 418 and the doorway image 420 (which is a representation of the doorway 120). In this example, based on determining that the video camera 108 is aiming at and/or focusing on the single speaker, the computing system 200 can perform beamforming in the first direction 302 on the person 114B (represented by the person image 414B) to generate a first beamformed signal 406, in the second direction 304 on a first noise source such as the person 114A (represented by the person image 414A) to generate a second beamformed signal 408 and/or second additional signal, and in a third direction 306 on a second noise source such as the doorway 120 (represented by the doorway image 420) to generate a third beamformed signal 422. The second direction 304 can be away from and/or different from the first direction 302, and the third direction 306 can be away from and/or different from both the first direction 302 and the second direction 304. Based on the video camera 108 aiming at and/or focusing on the single speaker and/or person 114B, the weighted sum of the first signal 406, second signal 408, and third signal 422, used to generate a combined signal 404C, can have a greater weight 410 for the first signal 406 than the weight 412 of the second signal and the weight 424 of the third signal 422. Based on all of the signals 406, 408, 422 having weights greater than zero, the combined signal 404C can be a combined monophonic signal that will focus on the single speaker due to the emphasis on the first signal 406 but also include background noise due to the contributions from the second and third signals 408, 422.

Figure 5:
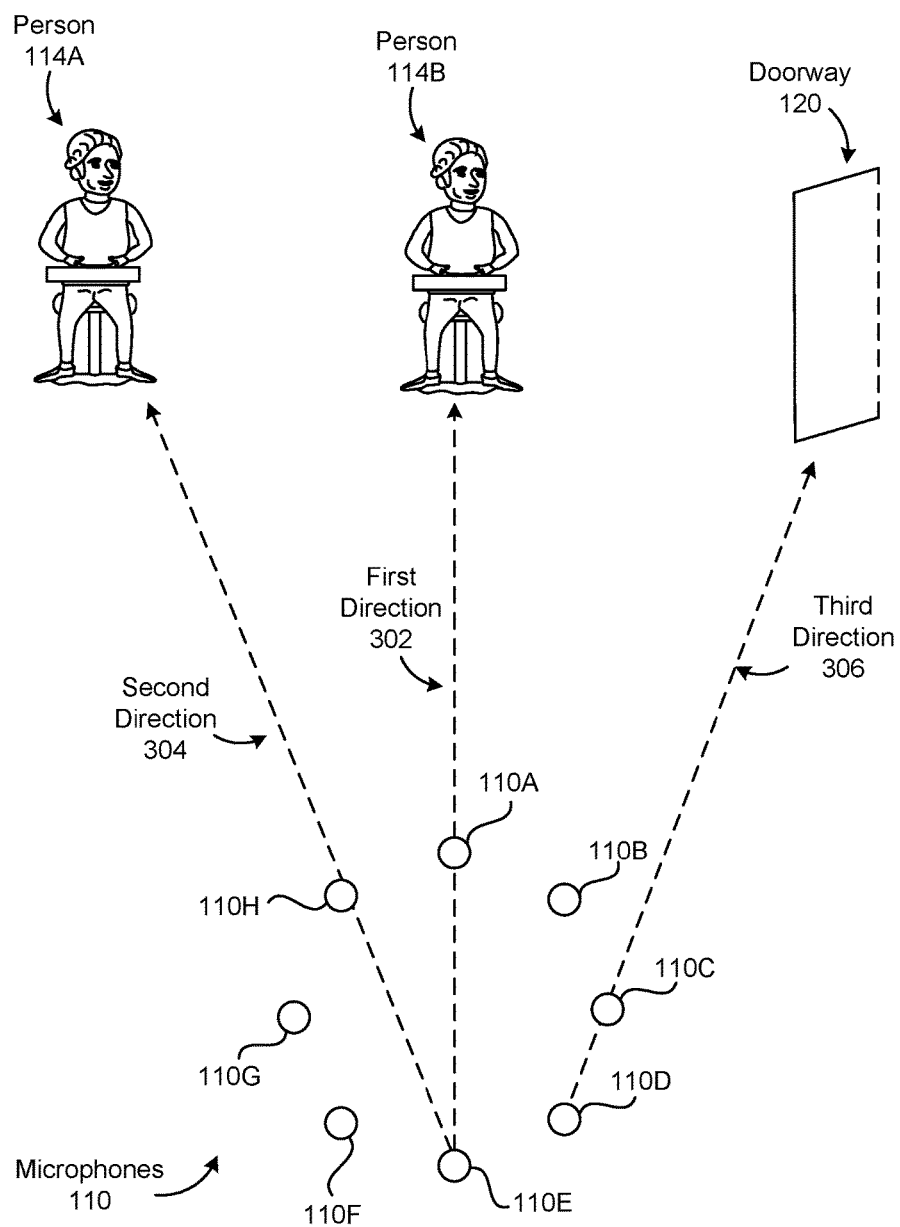
FIG. 5 is a diagram showing microphones and directions of beamforming toward different sources of audio signals according to an example.

FIG. 5 is a diagram showing microphones 110 and directions 302, 304, 306 of beamforming toward different sources of audio signals according to an example. The directions 302, 304, 306 can be paths along which audio signals travel from the noise sources (such as the persons 114A, 114B and doorway 120) to the microphones 110, and/or paths along which optical beams travel from the objects 114A, 114B (and/or persons), 120 (and/or doorway), based on which the images 414A, 414B, 420 are created, toward the video camera 108. The noise sources can include the person 114B a first direction 302 from the microphones 110, the person 114A a second direction 304 from the microphones 110, and the doorway 120 a third direction 306 from the microphones 110. In this example, the multiple microphones 110 form an array of microphones 110. In this example, the array of microphones 110 includes eight microphones 110A, 110B, 110C, 110D, 110E, 110F, 110G, 110H arranged in a circular pattern. Each of the microphones 110A, 110B, 110C, 110D, 110E, 110F, 110G, 110H can be in a different location than each of the other microphones 110A, 110B, 110C, 110D, 110E, 110F, 110G, 110H. After determining a direction of a noise source in which to focus and/or beamform, the computing system 200 can determine a pair of microphones 110A, 110B, 110C, 110D, 110E, 110F, 110G, 110H that, when a line or ray is drawn through the microphones, is more closely parallel than any other pair of microphones 110A, 110B, 110C, 110D, 110E, 110F, 110G, 110H to the direction of the noise source in which to focus and/or beamform.

In the example shown in FIG. 5, the microphones 110A, 110E form a line most closely parallel to the first direction 302. The microphone selector 208 can select microphones 110A, 110E for focusing and/or performing beamforming in the first direction 302, and the phase shifter 210 can delay the signals from the microphone 110A (which is closer than the microphone 110E to the person 114B who is the noise source) by an amount of time sound takes to travel the distance from the microphone 110A to the microphone 110E, thereby causing audio signals received by both microphones 110A, 110E from any noise source along the line of the first direction 302 to constructively interfere with each other.

In the example shown in FIG. 5, the microphones 110H, 110E form a line most closely parallel to the second direction 304. The microphone selector 208 can select microphones 110H, 110E for focusing and/or performing beamforming in the second direction 304, and the phase shifter 210 can delay the signals from the microphone 110H (which is closer than the microphone 110E to the person 114A who is the noise source) by an amount of time sound takes to travel the distance from the microphone 110H to the microphone 110E, thereby causing audio signals received by both microphones 110H, 110E from any noise source along the line of the second direction 304 to constructively interfere with each other.

In the example shown in FIG. 5, the microphones 110C, 110D form a line most closely parallel to the third direction 306. The microphone selector 208 can select microphones 110C, 110D for performing beamforming in the third direction 306, and the phase shifter 210 can delay the signals from the microphone 110C (which is closer than the microphone 110D to the doorway 120 which is the noise source) by an amount of time sound takes to travel the distance from the microphone 110C to the microphone 110D, thereby causing audio signals received by both microphones 110C, 110D from any noise source along the line of the third direction 306 to constructively interfere with each other.

Figure 6:
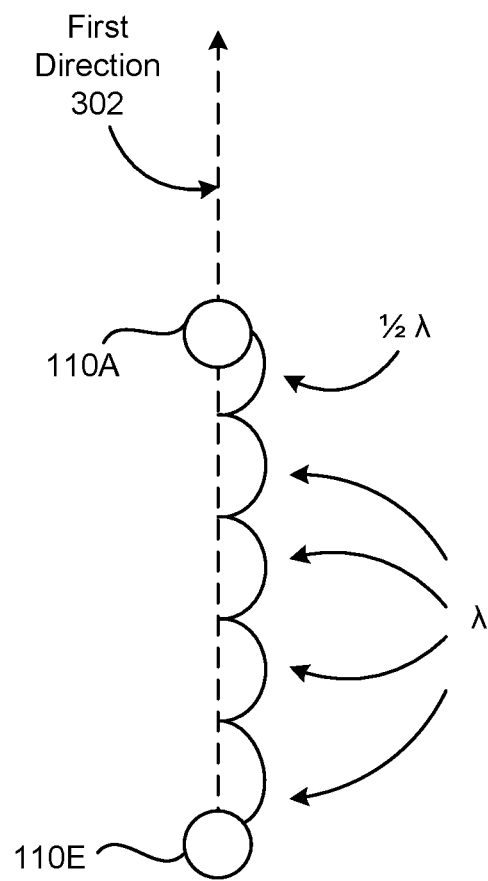
FIG. 6 is a diagram showing microphones and a number of wavelengths between the microphones along a direction of beamforming according to an example.

FIG. 6 is a diagram showing microphones 110A, 110E and a number of wavelengths A between the microphones 110A, 110E along a direction 302 of beamforming according to an example. In this example, the microphones 110A, 110E are four-and-a-half wavelengths apart. The distance between the microphones 110A, 110B may have been predetermined and stored in the memory 218 of the computing system 200. Distances between other pairs of microphones 110A, 110B, 110C, 110D, 110E, 110F, 110G 110H may also have been predetermined and stored in the memory 218 of the computing system 200. When beamforming along the first direction 302, the phase shifter 210 can delay the phase of the audio signals received by the microphone 110A by an amount of time for sound to travel the distance between the microphones, in this example four-and-a-half wavelengths from the microphone 110A to the microphone 110E (or some other distance and/or number of wavelengths for other pairs of microphones 110A, 110B, 110C, 110D, 110E, 110F, 110G 110H), and/or differences in distances between the one microphone 110A and the speaker 114B, and the distance between the microphone 110E and the single speaker 114B, such as by dividing the distance between the microphones 110A, 110E, and/or difference in distances, by the known speed of sound.

Figure 7:
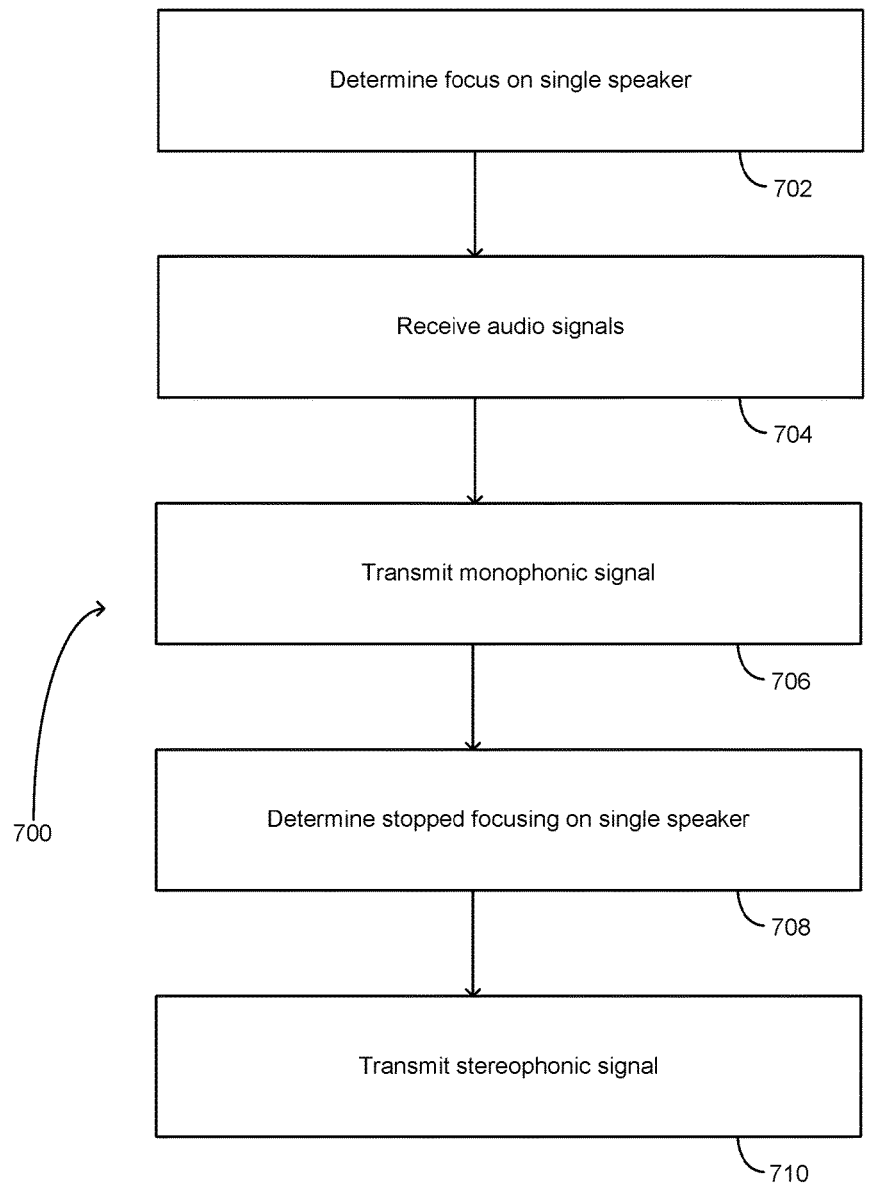
FIG. 7 is a flowchart showing a method according to an example.

FIG. 7 is a flowchart showing a method 700 according to an example. According to this example, the method 700 includes the aim determiner 202 determining that a video system is aiming at a single speaker of a plurality of people (702). The method 700 can also include the computing system 200 receiving audio signals from a plurality of microphones 110, the received audio signals including audio signals generated by the single speaker (704). The method 700 can also include the computing system 200, based on determining that the video system is aiming at the single speaker, transmitting a monophonic signal, the monophonic signal being based on the received audio signals (706). The method 700 can also include the aim determiner 202 determining that the video system is not aiming at the single speaker (708). The method 700 can also include the computing system 200, based on the determining that the video system is not aiming at the single speaker, transmitting a stereophonic signal, the stereophonic signal being based on the received audio signals.

According to an example, the monophonic signal can be based on the received audio signals and can focus on the single speaker, and the stereophonic signal can include the monophonic signal and an additional signal. The additional signal can be based on the received audio signals and can focus on a noise source other than the single speaker.

According to an example, the method 700 can further include the computing system 200 generating the monophonic signal by performing a beamforming operation on the received audio signals in a direction of the single speaker.

According to an example, the method 700 can further include the computing system 200 generating the monophonic signal by preferentially weighting audio signals emitted along a path passing through at least one of the plurality of microphones and the speaker as compared with sounds emitted from outside the path.

According to an example, the determining that the video system is aiming at the single speaker can include processing a single speaker signal from the video system, the single speaker signal indicating that the video system is aiming at the single speaker, and the determining that the video system is not aiming at the single speaker can include processing a multiple speaker signal from the video system, the multiple speaker signal indicating that the video system is aiming at multiple speakers.

According to an example, the stereophonic signal can include a first audio signal based on a first microphone of the plurality of microphones and a second audio signal based on a second microphone of the plurality of microphones.

According to an example, the method 700 can further include the computing system 200 generating the monophonic signal by shifting a phase of an audio signal received from at least one microphone of the plurality of microphones relative to at least one other microphone of the plurality of microphones, the shifting being based on differences in distances between the at least one microphone and the single speaker, and the at least one other microphone and the single speaker.

According to an example, the method 700 can further include the computing system 200 generating the monophonic signal by shifting a phase of at least a first audio signal received by a first microphone of the plurality of microphones from the single speaker so that at least a portion of the first audio signal received from the single speaker constructively interferes with at least a portion of a second audio signal received by a second microphone of the plurality of microphones, the second microphone being in a different location than the first microphone.

According to an example, the method 700 can further include the computing system 200, based on determining that the video system is aiming at the single speaker, generating a first audio signal by beamforming multiple audio signals received by the plurality of microphones from a direction of the single speaker, generating a second audio signal by beamforming multiple audio signals received by the plurality of microphones from a direction away from the single speaker, and generating the monophonic signal based on a weighted sum of the first audio signal and the second audio signal, the first audio signal receiving a greater weight relative to the second audio signal. In this example, the transmitting the stereophonic signal can include transmitting the first audio signal and the second audio signal as distinct audio signals.

According to an example, the computing system 200 can include a video camera configured to aim at the single speaker and capture images of the single speaker, the plurality of microphones configured to capture the received audio signals in a direction of the single speaker, and a local computing device configured to receive the captured images from the video camera, send the captured images to a remote computing device, receive the audio signals from the plurality of microphones, determine that the video camera is aiming at the single speaker, based on the determining that the video camera is aiming at the single speaker, beamform the received audio signals in the direction of the single speaker to generate a first beamformed signal, based on the beamforming, transmit the monophonic signal to the remote computing device, determine that the video camera is not aiming at the single speaker, based on the determining that the video camera is not aiming at the single speaker, beamform the received audio signals in a direction other than the direction of the single speaker to generate a second beamformed signal, and transmit the stereophonic signal to the remote computing device, the stereophonic signal including the first beamformed signal and the second beamformed signal.

Figure 8:
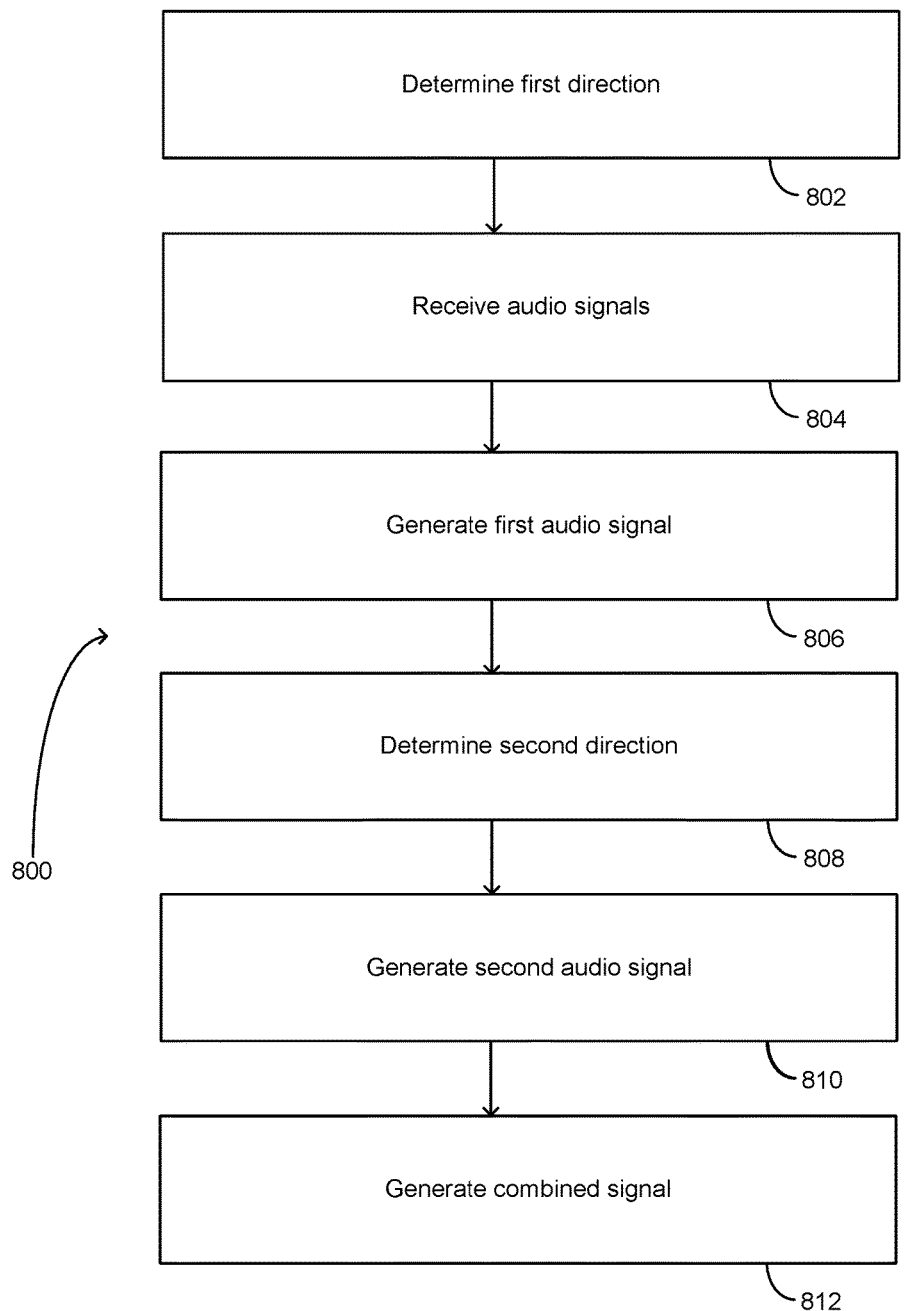
FIG. 8 is a flowchart showing a method according to another example.

FIG. 8 is a flowchart showing a method 800 according to another example. According to this example, the method 800 can include the direction determiner 204 determine a first direction of a speaker that a video system is aiming at (802). The method 800 can also include the computing system 200 receiving audio signals from a plurality of microphones 110 (804). The method 800 can also include the beamformer 206 generating a first audio signal based on the received audio signals and focusing on the first direction (806). The method 800 can also include the direction determiner 204 determining a second direction of a noise source other than the speaker (808). The method 800 can also include the beamformer 206 generating a second audio signal based on the received audio signals and focusing on the second direction (810). The method 800 can also include the signal combiner 212 generating a combined and/or stereophonic signal based the first audio signal and the second audio signal (812).

According to an example, the determining the first direction (802) can include determining that the first audio signal is changing as a function of time.

According to an example, the generating the first audio signal (806) can include beamforming the received audio signals in the first direction, and the generating the second audio signal (810) can include beamforming the received audio signals in the second direction.

According to an example, the generating the stereophonic signal (812) can include generating the stereophonic signal based on a weighted sum of the first audio signal and the second audio signal, the first audio signal receiving a greater weight relative to the second audio signal.

According to an example, the stereophonic signal can include the first audio signal and an indicator of the first direction, and the second audio signal and an indicator of the second direction.

According to an example, the noise source can be a first noise source. In this example, the method 800 can further include determining a third direction of a second noise source, the third direction being different than the first direction and the second direction, the second direction being different than the first direction, and generating a third audio signal based on the received audio signals and the third direction. In this example, the generating the stereophonic signal (812) can include generating the stereophonic signal based on a weighted sum of the first audio signal, the second audio signal, and the third audio signal, the first audio signal receiving a greater weight relative to the second audio signal and the third audio signal.

According to an example, the computing system 200 can include the video system configured to aim at the speaker in the first direction, the plurality microphones configured to receive the audio signals, and a local computing device configured to send video signals received by the video system to a remote computing device, determine the first direction, generate the first audio signal, determine the second direction, generate the second audio signal, generate the stereophonic signal, and send the stereophonic signal to the remote computing device.

According to an example, the method 800 can further include at least two electronic speakers 130A, 130B that are remote from the computing system 200 to output an outputted audio signal based on the stereophonic signal.

Figure 9:
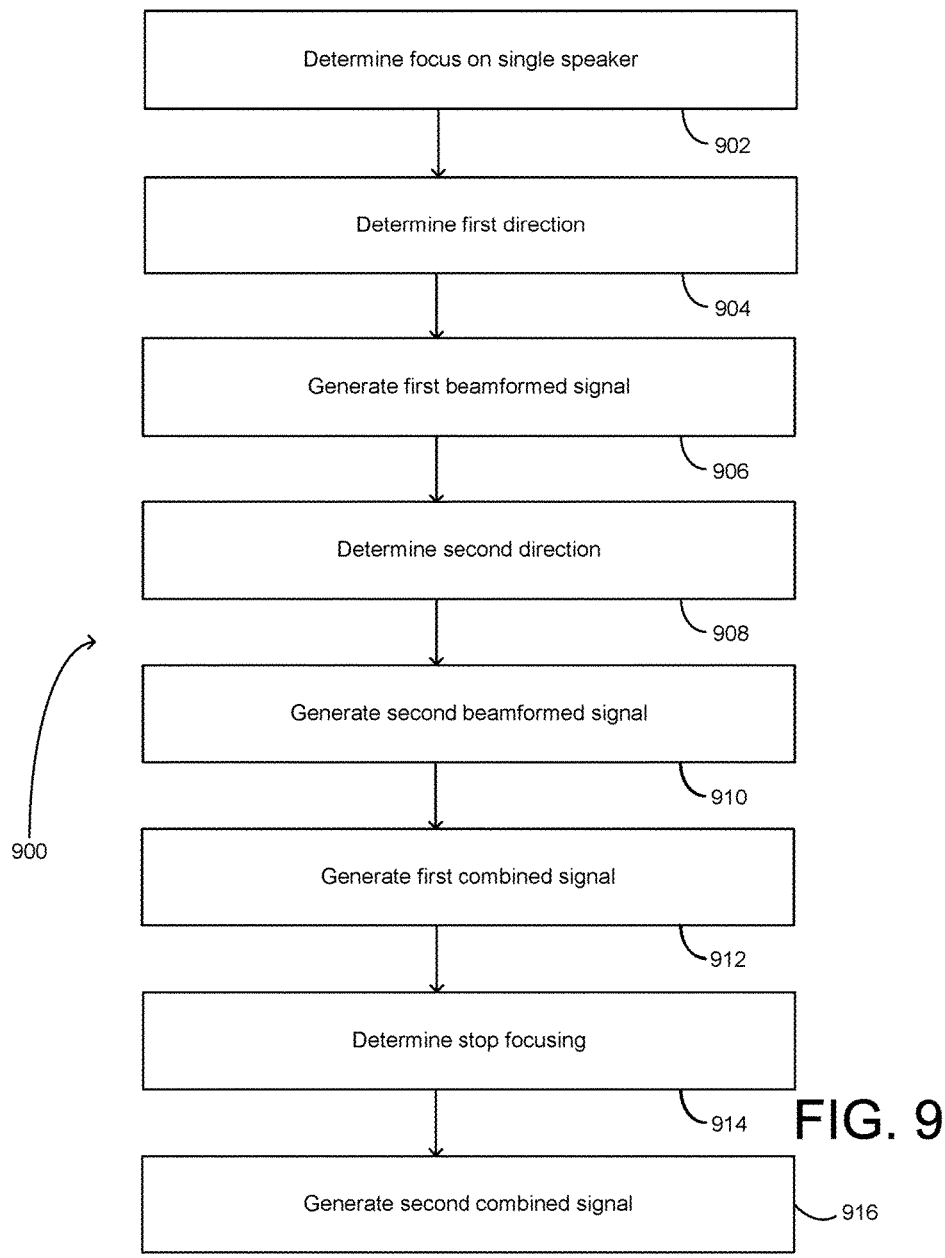
FIG. 9 is a flowchart showing a method according to another example.

FIG. 9 is a flowchart showing a method 900 according to another example. The method 900 can be performed by the computing system 200. The method 900 can include the aim determiner 202 determining that a video system is aiming at a single speaker (902). The method 900 can also include the direction determiner 204 determining a first direction of the single speaker from an array of microphones 110 (904). The method 900 can also include, based on determining that the video system is aiming at the single speaker and the first direction of the single speaker, the beamformer 206 generating a first beamformed signal based on beamforming, in the first direction, multiple first direction audio signals received by the array of microphones 110 (906). The method 900 can also include the direction determiner 204 determining a second direction of a noise source other than the single speaker (908). The method 900 can also include the beamformer 206 generating a second beamformed signal based on beamforming, in the second direction, multiple second direction audio signals received by the array of microphones in the second direction (910). The method 900 can also include the signal combiner 212 generating a monophonic signal based on the first beamformed signal and the second beamformed signal, the first beamformed signal having greater weight relative to the second beamformed signal (912). The method 900 can also include the aim determiner 202 determining that the video system is not aiming at the single speaker (914). The method 900 can also include the signal combiner 212, based on determining that the video system is not aiming at the single speaker, generating a stereophonic signal, the stereophonic signal including the first beamformed signal and the second beamformed signal as distinct signals (916).

According to an example, the method 900 can also include sending the monophonic signal to a videoconference system that is remote from the computing system, and sending the stereophonic signal to the videoconference system.

According to an example, the generating the first beamformed signal (906) can include modifying phases of audio signals received by the array of microphones, the modifications being based on differences in distances between microphones in the array of microphones and the single speaker.

Figure 10:
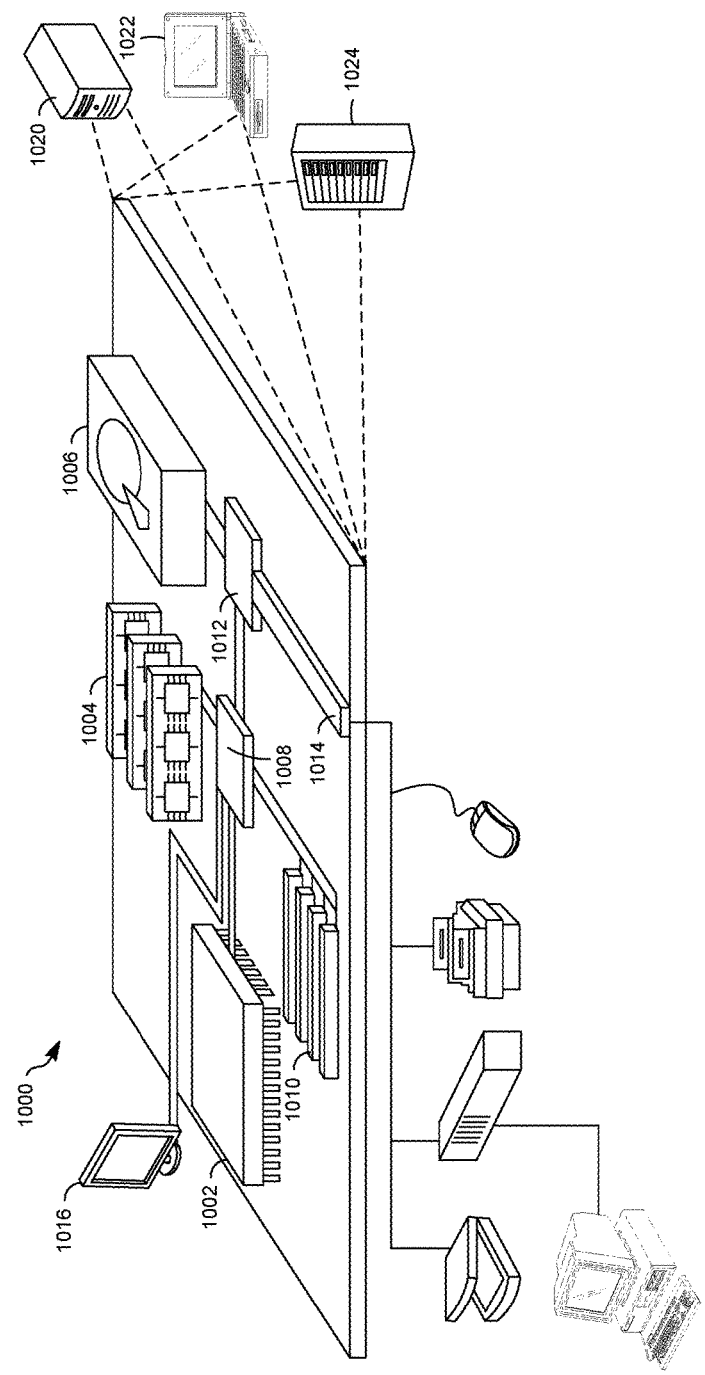
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable storage medium comprising instructions stored thereon that, when executed by at least one processor, are configured to cause a computing system to:
    determine that a video system is aiming at a single speaker of a plurality of people;
    receive audio signals from a plurality of microphones, the received audio signals including audio signals generated by the single speaker;
    based on determining that the video system is aiming at the single speaker, transmit a monophonic signal, the monophonic signal being based on the received audio signals;
    determine that the video system is not aiming at the single speaker; and
    based on the determining that the video system is not aiming at the single speaker, transmit a stereophonic signal, the stereophonic signal being based on the received audio signals.

2. The non-transitory computer-readable storage medium of claim 1, wherein:
    the monophonic signal is based on the received audio signals and focuses on the single speaker; and
    the stereophonic signal includes the monophonic signal and an additional signal, the additional signal being based on the received audio signals and focusing on a noise source other than the single speaker.

3. The non-transitory computer-readable storage medium of claim 1, wherein the instructions are further configured to cause the computing system to generate the monophonic signal by performing a beamforming operation on the received audio signals in a direction of the single speaker.

4. The non-transitory computer-readable storage medium of claim 1, wherein the instructions are further configured to cause the computing system to generate the monophonic signal by preferentially weighting audio signals emitted along a path passing through at least one of the plurality of microphones and the speaker as compared with sounds emitted from outside the path.

5. The non-transitory computer-readable storage medium of claim 1, wherein:
    the determining that the video system is aiming at the single speaker comprises processing a single speaker signal from the video system, the single speaker signal indicating that the video system is aiming at the single speaker; and
    the determining that the video system is not aiming at the single speaker comprises processing a multiple speaker signal from the video system, the multiple speaker signal indicating that the video system is aiming at multiple speakers.

6. The non-transitory computer-readable storage medium of claim 1, wherein the stereophonic signal includes a first audio signal based on a first microphone of the plurality of microphones and a second audio signal based on a second microphone of the plurality of microphones.

7. The non-transitory computer-readable storage medium of claim 1, wherein the instructions are further configured to cause the computing system to generate the monophonic signal by shifting a phase of an audio signal received from at least one microphone of the plurality of microphones relative to at least one other microphone of the plurality of microphones, the shifting being based on differences in distances between the at least one microphone and the single speaker, and the at least one other microphone and the single speaker.

8. The non-transitory computer-readable storage medium of claim 1, wherein the instructions are further configured to cause the computing system to generate the monophonic signal by shifting a phase of at least a first audio signal received by a first microphone of the plurality of microphones from the single speaker so that at least a portion of the first audio signal received from the single speaker constructively interferes with at least a portion of a second audio signal received by a second microphone of the plurality of microphones, the second microphone being in a different location than the first microphone.

9. The non-transitory computer-readable storage medium of claim 1, wherein the instructions are configured to cause the computing system to:
based on determining that the video system is aiming at the single speaker:
generate a first audio signal by beamforming multiple audio signals received by the plurality of microphones from a direction of the single speaker;
generate a second audio signal by beamforming multiple audio signals received by the plurality of microphones from a direction away from the single speaker; and
generate the monophonic signal based on a weighted sum of the first audio signal and the second audio signal, the first audio signal receiving a greater weight relative to the second audio signal,
wherein the transmitting the stereophonic signal comprises transmitting the first audio signal and the second audio signal as distinct audio signals.

10. The non-transitory computer-readable storage medium of claim 1, wherein the computing system comprises:
a video camera configured to aim at the single speaker and capture images of the single speaker;
the plurality of microphones configured to capture the received audio signals in a direction of the single speaker; and
a local computing device configured to:
receive the captured images from the video camera;
send the captured images to a remote computing device;
receive the audio signals from the plurality of microphones;
determine that the video camera is aiming at the single speaker;
based on the determining that the video camera is aiming at the single speaker, beamform the received audio signals in the direction of the single speaker to generate a first beamformed signal;
based on the beamforming, transmit the monophonic signal to the remote computing device;
determine that the video camera is not aiming at the single speaker;
based on the determining that the video camera is not aiming at the single speaker, beamform the received audio signals in a direction other than the direction of the single speaker to generate a second beamformed signal; and
transmit the stereophonic signal to the remote computing device, the stereophonic signal including the first beamformed signal and the second beamformed signal.

11. A method performed by a computing system, the method comprising:
determining that a video system is aiming at a single speaker;
determining a first direction of the single speaker from an array of microphones;
based on determining that the video system is aiming at the single speaker and the first direction of the single speaker, generating a first beamformed signal based on beamforming, in the first direction, multiple first direction audio signals received by the array of microphones;
determining a second direction of a noise source other than the single speaker;
generating a second beamformed signal based on beamforming, in the second direction, multiple second direction audio signals received by the array of microphones in the second direction;
generating a monophonic signal based on the first beamformed signal and the second beamformed signal, the first beamformed signal having greater weight relative to the second beamformed signal;
determining that the video system is not aiming at the single speaker; and
based on determining that the video system is not aiming at the single speaker, generating a stereophonic signal, the stereophonic signal including the first beamformed signal and the second beamformed signal as distinct signals.

12. The method of claim 11, further comprising:
sending the monophonic signal to a videoconference system that is remote from the computing system; and
sending the stereophonic signal to the videoconference system.

13. The method of claim 11, wherein the generating the first beamformed signal includes modifying phases of audio signals received by the array of microphones, the modifications being based on differences in distances between microphones in the array of microphones and the single speaker.

* * * * *